United States Patent [19]

Grubbs

[11] 4,077,000
[45] Feb. 28, 1978

[54] DIRECTIONAL ANTENNA AZIMUTH CONTROL SYSTEM

[76] Inventor: Jerry A. Grubbs, 678 Leland Drive, Taylor Mill, Ky. 41015

[21] Appl. No.: 759,249

[22] Filed: Jan. 13, 1977

[51] Int. Cl.$^2$ .......................................... G05B 19/30
[52] U.S. Cl. ................................ 318/604; 318/672; 318/673; 318/675
[58] Field of Search ................ 318/16, 672, 673, 675, 318/681, 602, 604

[56] References Cited

U.S. PATENT DOCUMENTS

| | | | |
|---|---|---|---|
| 3,456,173 | 7/1969 | Funfstuck | 318/673 |
| 3,571,686 | 3/1971 | Henegar | 318/672 X |
| 3,826,964 | 7/1974 | Byrne | 318/602 |
| 3,962,620 | 6/1976 | Dion | 318/604 X |

Primary Examiner—B. Dobeck
Attorney, Agent, or Firm—Wood, Herron & Evans

[57] ABSTRACT

A system for selectively aiming a directional receiving antenna in one of a plurality of different directions respectively associated with a plurality of broadcast transmitters differently located in azimuth relative to the antenna in response to the entry into a digital keyboard of the different identification numbers assigned to the different transmitters.

6 Claims, 1 Drawing Figure

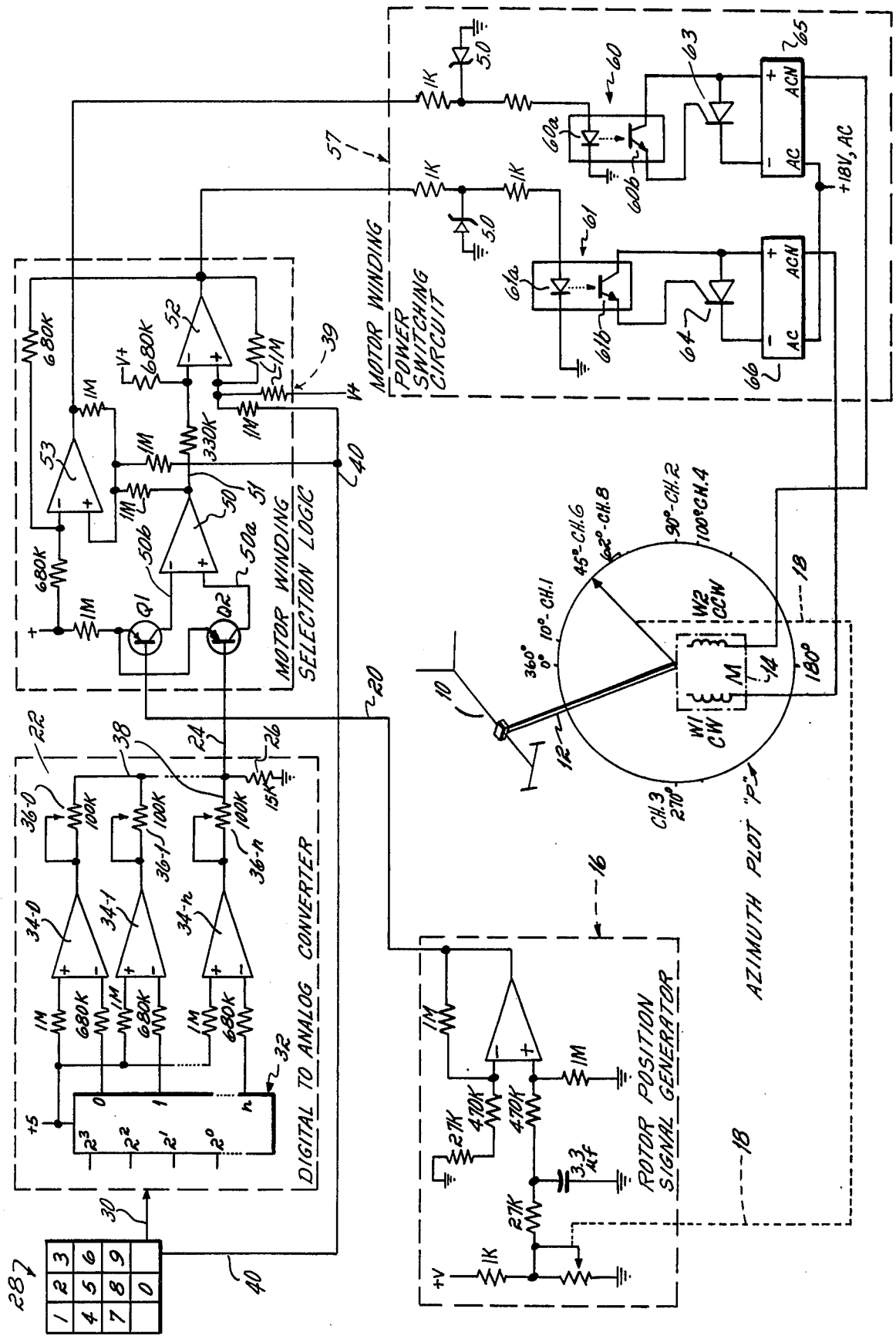

DIRECTIONAL ANTENNA AZIMUTH CONTROL SYSTEM

This invention relates to apparatus for selectively positioning in azimuth a directional antenna, and more particularly to antenna positioning apparatus which selectively aims a directional receiving antenna at differently positioned broadcast transmitters in response to entry of different digital identification numbers assigned to the different transmitters.

In an area serviced by more than one television transmitting station optimum reception of television signals by a television receiver from the various broadcast transmitters is achieved with a directional antenna which is aimed, on a selective basis, at the broadcast transmitter of the channel which the user desires to receive. For example, for a given television receiver location optimum reception of one channel having a broadcast transmitter located in a northerly direction is achieved by orienting the directional television receiving antenna in a northerly direction. Similarly, optimum reception, for the same television receiver, of a signal broadcast from a transmitter located in a southerly direction is obtained by orienting the directional television receiving antenna in a southerly direction. Obviously, when the user desires to change channels, i.e., to receive a broadcast from a transmitter other than the one at which the antenna is presently directed, it is necessary to rotate the antenna such that it is aimed in the direction of the transmitter of the new channel from which the user now desires to receive signals.

To minimize inconvenience to the owner of the television receiver, it is desirable that as the television viewer changes the television tuner from one channel to another that the directional antenna also change its direction from one broadcast transmitter to the other. The foregoing objective has been accomplished in accordance with the principles of this invention by providing, with a directional antenna driven by a bidirectional motor having separately energizable clockwise and counterclockwise antenna drive windings, the combination (a) a digital encoder for selectively providing a signal on different output terminals thereof, each output terminal associated with a different channel receiving direction, in response to manual entry of different channel identifications, (b) an analog encoder connected to the output terminals of the digital encoder and having a single output terminal for providing d.c. voltages of different magnitudes in response to the selection of different channels, (c) an antenna azimuthal direction transducer for providing d.c. voltages of different magnitude corresponding to different azimuthal orientations of the antenna, and (d) a comparator for comparing the output voltages of the antenna direction transducer and the analog encoder, the comparator being operative to provide a first control signal to the clockwise antenna drive winding when selection of a channel necessitates rotation of the antenna in a clockwise direction and a second control signal on a second output terminal when the channel selected requires rotation of the antenna in a counterclockwise direction.

In accordance with a preferred embodiment of this invention the analog encoders are each selectively adjustable such that for broadcast transmitters located at predetermined fixed locations, the analog voltage output corresponding to each channel can be varied in magnitude, and hence the orientation of the antenna altered for receiving that channel, as the location of the receiver varies from one position to another with respect to the fixed location transmitters.

In a preferred form of the invention the channel selector includes a keyboard having digital keys for entering on a sequential basis the digits of identification numbers assigned to different broadcast transmitters, which are then converted by the digital encoder for input to the analog encoder. Alternatively, the channel selector could be a rotary switch which, as it is rotated to different channels, applies the different channel outputs to the analog encoder.

Regardless of whether the channel identification number is selected with a digital keyboard or a rotary switch, the same channel selector utilized in operating the TV tuner can be utilized to provide the channel identifying signals input to the analog encoder.

These and other advantages, features and objectives of the invention will become more readily apparent from a detailed description thereof taken in conjunction with the drawings in which the FIGURE is a schematic circuit diagram of a preferred embodiment of a rotary drive direction control circuit constructed in accordance with the principles of this invention.

By way of background, but not by way of limitation, the control circuit of this invention is described in connection with its utility in controlling the azimuth of a directional television signal receiving antenna 10 which is mounted atop a vertically disposed rotatable shaft 12. The shaft 12 at its lower end is drivingly connected to a bidirectional electric motor 14 having selectively energizable windings W1 and W2. The windings W1 and W2, which are alternatively energized in a manner to be described hereafter, rotates the shaft 12 and the antenna 10 in one or the other opposite directions depending upon which of the windings W1 or W2 is energized.

Also associated with the antenna 10 is an antenna azimuth position signal generator 16. The antenna azimuth position signal generator 16 is responsive to the instantaneous azimuthal position of the antenna 10, as indicated diagrammatically by the dotted line 18, and provides on its output line 20 an electrical signal correlated to the instantaneous azimuthal direction of the antenna. For example, antenna position signal generator 16 provides on output line 20 an analog d.c. electrical signal which varies between zero and some selected value, V volts, depending upon whether the antenna azimuth direction as shown on plot P is 0° or 359°, with the output voltage magnitude varying linearly between 0 volts and V volts or varying antenna positions between 0° and 359°, respectively. If, for example, the antenna 10 is disposed such that its azimuth is 45°, the output 20 of the rotor position signal generator is at (V/8) volts d.c.; if the azimuthal angle of the antenna is 90°, the output on line 20 is (V/4) volts; etc.

The circuit of this invention also includes a command position signal generator 22 which provides on its output line 24 an analog d.c. electrical signal having a magnitude correlated to the azimuthal position to which it is desired to drive the antenna 10. For example, the command position signal generator 22 may provide on its output line 24 signals varying between 0 volts d.c. and some selected value, e.g., V volts, depending upon the position between 0° and 359° to which it is desired to drive the antenna 10. Stated differently, desired antenna azimuthal positions between 0° and 359° are reflected by d.c. signal magnitudes on output line 24 which vary linearly between 0 volts and V volts depending upon the specific angle between 0° and 359° to which it is desired to drive the antenna 10.

The command position signal generator 22 is provided with an input from a channel encoder keyboard 28 on line 30. The channel encoder 28, in a preferred form, is a 10-digit keyboard, having digit keys of 0, 1, . . . 9, which provides on output line 30 digital signals correlated to the TV channel entered into the keyboard by the user. For example, if the user wishes to have the antenna 10 rotate to a predetermined azimuth representing the best direction for receiving signals from the TV broadcast transmitter for channel 1, the user activates the digit key "1" of the channel encoder 28. The channel encoder, in response thereto, provides on its output line 30 a digital signal, preferably in binary format, correlated to channel 1. On the other hand, if the user desired that the antenna 10 be rotated to the direction to receive signals from the TV broadcast antenna of channel 12, the user activates in sequence the digit keys "1" and "2." In response thereto, the channel encoder 28 provides on output line 30 binary signals representative of channel 12.

Assuming the channel encoder 28 provides on its output line 30 binary signals correlated to the particular channel selected, the command position signal generator 22 includes a binary-to-decimal converter 32 having four separate input lines correlated to the binary positional values $2^0, 2^1, 2^2, 2^3$, respectively. Thus, if channel 2 is entered into the channel encoder 28 by activation of the "2" key, the signals output on line 30 to the binary-to-decimal converter 32 will provide logical signal values 0, 1, 0 and 0 on the input lines to the binary-to-decimal converter designated $2^0, 2^1, 2^2$, and $2^3$, respectively. In response to binary signals input to the binary-to-decimal converter 32 from the channel encoder 30 representative of the channel selected by the user's signals are provided on decimal output terminals designated 0, 1, 2, . . . $n$ depending upon the particular channel selected. For example, if channel 7 is desired and the operator has activated the "7" key of the channel encoder 28 to provide logical signal levels of "1," "1," "1" and "0" at terminals of the binary-to-decimal converter designated $2^0, 2^1, 2^2$, and $2^3$, a logical "1" signal will be output from the binary-to-decimal converter 32 at the decimal terminal designated 7. In a preferred form, logical "1" signals at terminals designated 0, 1, 2 . . . $n$ at the output of the binary-to-decimal converter 32 are manifested by a relatively low voltage, while logical "0" signals at the se terminals are represented by a relatively high voltage.

Inverters 34-0, 34-1, . . . 34-$n$ are respectively individually responsive to the decimal output terminal designated 0, 1, 2, . . . $n$ of the binary-to-decimal converter 32. The inverters 34-0, 34-1, . . . 34-$n$ provide on their respective output lines relatively high level signals in response to relatively low level input signals thereto from their respectively associated binary-to-decimal converter outputs, and vice versa. Thus, a logical "1" output at decimal terminal 2 of converter 32 manifested by a relatively low level signal appears as a relatively high level signal at the output of the inverter 34-2 which is still symbolic of a logical "1" notwithstanding inversion.

Responsive to the outputs of the inverters 34-0, 34-1, . . . 34-$n$ are weighting resistors 36-0, 36-1, . . . 36-$n$ which function to provide on common output line 38 respectively differently valued d.c. voltage level signals correlated in magnitude to the selectively adjustable resistance values of the weighting resistors which preferably are in the form of potentiometers. For example, if an operator desiring that the antenna 10 be rotated to receive channel 2 and activated the "2" key of the channel encoding keyboard 28, a logical "1" signal would be output from the inverter 34-2 associated with channel 2. The logical "1" signal from inverter 34-2 is provided across weighting resistor 36-2 and a voltage dividing resistor 26 common to all weighting resistors connected between output line 24 and ground potential. Depending upon the setting of the weighting potentiometer 36-2 a voltage will be provided on line 38 somewhere between 0 and V volts, with the exact voltage level being correlated to the azimuthal angle associated with channel 2. If the azimuthal antenna direction associated with channel 2 is 90°, then the potentiometer 36-2 is set such that when an operator has entered a 2 into the channel encoder 28 to provide a logical "1" output from the inverter 34-2, a voltage of V/4 volts wil appear on line 24. Similarly, if the operator has entered channel 6 into the channel encoder 28 providing a logical "1" output from inverter 34-6, and the azimuthal antenna direction for channel 6 is 45°, the potentiometer 36-6 is adjusted to provide V/8 volts on line 24.

As noted previously, the output on line 24, depending upon the channel selected, can be anywhere between 0 and V volts, with a 0 volt output corresponding to 0° azimuthal antenna direction and V volts corresponding to 359°; voltages between 0 and 5 volts correspond to antenna directions between 0° and 359°. Obviously, the range of voltages output on line 24, in the preferred embodiment the range being 0-V volts d.c., can be selected as desired. For example, the voltage range corresponding to a full 360° of azimuthal antenna rotation could be 12 volts, varying from a low of, for example, 8 volts corresponding to 0° to 20 volts corresponding to 359°.

In addition, if there are $n$ different weighting resistors 36-0, 36-1, . . . 36-$n$ their respectively associated output voltages on line 24 need not vary in equal increments, and in fact will probably not so vary, unless the broadcast transmitters for channels 0, 1, . . . $n$ are arranged in equal azimuthal directions around the antenna 10. Normally, the broadcast transmitters of the various TV channels are arranged in more or less random fashion with respect to the receiving antenna 10. For example, TV channel 1 may have an azimuthal receiving direction with respect to the antenna 10 of 10°; channel 2 has a receiving direction of 90°; channel 3 has a receiving direction of 270°; channel 4 has a receiving direction of 100°; etc. Thus, in setting the value of any given one of the weighting potentiometers 36-0, 36-1, . . . 36-$n$, it is necessary to determine the azimuthal direction with respect to the antenna 10 of the broadcast transmitter of the channel in question. Knowing the direction and knowing the total voltage range available for representing 360° of azimuthal rotation, the potentiometer resistance value can be selected to provide a d.c. output signal on line 24 for its respective channel correlated to the azimuthal direction of the braodcast transmitter of that particular channel.

A motor winding selection logic circuit 39 is provided to alternatively and selectively energize one or the other of the windings W1 or W2 of the antenna drive motor 14 to rotate the antenna 10 clockwise or counterclockwise, as the case may be, when a channel is entered into the encoder 28, which entered channel has a corresponding antenna azimuth position which is different from the present position of the antenna 10. Assuming the motor winding W2, when energized, rotates the antenna 10 in a counterclockwise direction with respect to the azimuthal plot P and the winding W1, when energized, rotates the antenna 10 in a clockwise direction, the motor winding selection logic circuit 39, when a channel is entered into the encoder 28, compares the signal on line 20 representative of the present actual antenna position with the signal on line 24 representative of the desired antenna azimuthal position, and in response thereto energizes one or the other the the windings W1 or W2, as the case may be, depending on whether it is necessary to rotate the antenna clockwise or counterclockwise to reposition the antenna from its present position to its desired position. For example, if the present antenna azimuthal position is 90° corresponding to, for example, channel 2, and the operator enters into the channel encoder 28 channel 6 which is located at 45°, the motor winding selection logic circuit 39 will compare the input on lines 24 and 20 corresponding to desired and actual antenna positions, respectively, and energize winding W2 to rotate the antenna in a counterclockwise position from its present position of 90° for channel 2 to the desired position of 45° for channel 6. Upon arrival of the antenna at 45° corresponding to the desired direction for channel 6, the motor winding selecting logic circuit 29 will de-energize the winding W2 and the antenna will, except for slight overshoot, be located at approximately 45° corresponding to the preferred direction for selected channel 6 entered into the channel encoder 28.

A further input to the motor winding selection logic circuit 39 is provided on line 40. The input on line 40 takes the form of a positive pulse of approximately 5 seconds duration each time a channel entry is made in the channel encoder 28. The positive pulse on line 40 can be provided by any suitable means, for example, the digit keys of the channel encoder 28 could be connected in common to the input of a monostable multivibrator which, upon actuation of any digit key, provides on line 40 the desired positive pulse of 5 second duration.

The motor winding selection logic circuit 39, considered in more detail, includes a steering circuit, preferably in the form of first current comparator 50, having an output line 51 and two input lines 50a and 50b connected to the positive and negative input terminal thereof. Input line 50a is responsive via a transistor Q2 to the output on line 24 from the command position signal generator, which as described earlier, is correlated in magnitude to the position to which it is desired to drive the antenna. Input line 50b is responsive via transistor Q1 to line 20, which as indicated, constitutes the output of the antenna position signal generator 16 on whcih appears a signal correlated to the present position of the antenna, Both transistors Q1 and Q2 are normally conducting, although the degree of conductance of each depends on the magnitude of the inputs on lines 20 and 24.

The comparator 50, as noted, preferably is a current comparator and provides on output line 51 a logical "0" if the input currents on line 50a and 50b from the command position signal generator 22 and the antenna position signal generator 16, respectively, are equal, that is, the antenna 10 occupies the position associated with the last channel entered into the channel encoder 28. The output of the current comparator 50 is also at a logical 0 or low level if the current input to the negative terminal is greater than the current input to the positive terminal. If the current input to the positive terminal is greater than the current input to the negative terminal of the comparator 50 the comparator 50 provides on its output line 51 a logic "1" or high level signal.

Assuming that the antenna 10 is directed at an angle of 45° corresponding to channel 6, channel 6 having been entered into the channel encoder 28 some considerable time earlier, at least more than 5 seconds earlier, the input on line 24 from the command position signal generator and the input on line 20 from the antenna position signal generator are equal and there is no pulse on line 40. Under such circumstances, the current comparator 50 provides a low level, or logical 37 0," at its output terminal. In addition, the currents going into the negative input terminals of a pair of current comparators 52 and 53, which are each responsive to the output of comparator circuit 50, exceeds that flowing into the positive input terminals of comparators 52 and 53 from line 40, which under the assumed conditions does not have applied to it from the address circuit 28 a positive pulse, with the result that the outputs of both the current comparators 52 and 53 are at low level or logical "0" state, and the motor winding power switching circuit 57 does not energize either the clockwise winding W1 or the counterclockwise winding W2.

Now, assume that an operator enters into the channel encoder 28 the address of channel 2 corresponding to an azimuthal direction of 90°. At the time of entry of the address into the encoder 28 two things occur. First, a 5 second duration positive pulse is placed on line 40 from the channel encoder 28 to the positive input terminals of current comparators 52 and 53, and an increased voltage is placed on the line 24 by the antenna position signal generator 22 corresponding to the increased azimuthal direction of 90° to which it is desired to rotate the antenna as a consequence of entering channel 2 into the channel encoder at a time when the antenna is actually at 45° for channel 6. Since the input on line 24 corresponding to the command position of 90° for channel 2 now exceeds the input on line 20 corresponding to the present antenna position of 45° for channel 6, voltage input to the base of transistor Q2 exceeds that input to the base of transistor Q1. As a result, transistor Q2 conducts less than transistor Q1.

This produces a larger current on line 50b to the negative input terminal current comparator 50 than is input to the positive terminal thereof on line 50a, which in turn provides a logical "0" or low level output on comparator output line 51. As noted, as an incident to entering the new channel into the encoder, the 5 second duration pulse is input on line 40 to the positive input terminals of the current comparators 52 and 53. Under these circumstances, and with a logical "0" or low level signal on line 51 from the current comparator 50 to the positive input terminal of current comparator 53, the output of current comparator 53 is at a logical "0" or low level. As a consquences, winding W2 remains de-energized.

With a logical "0" or low level signal on output line 51 of current comparator 50, which is input to the negative terminal of current comparator 52, and a positive pulse input to the positive terminal of current comparator 52 on line 40, a logical "1" or high level signal is output from the current comparator 52, which latches the current comparator 52 in a high output level state via the feedback resistor from the output to the positive input terminal. With the current comparator 52 latched in a high output level condition, a logical 1," or relatively high level output signal, is provided to energize the clockwise motor winding W1 causing the antenna 10 to start rotating from the 45° position associated with channel 6 toward the 90° position associated with channel 2.

At the instant the motor winding W1 is energized, transistor Q1 is driving the negative input terminal of current comparator 50 harder than transistor Q2 is driving the positive terminal of current comparator 50 due to the fact that the command position signal generator output on line 24 is more positive than the actual antenna position signal on line 20. As the antenna 10 moves toward 90° the amplitude of the signal on line 20 to the base of transistor Q1 increases, causing transistor Q1 to be driven less hard. This continues until the antenna 10 slightly overshoots the 90° position corresponding to desired channel 6. When the rotor does slightly overshoot the desired position, the voltage on line 20 corresponding to the actual antenna position exceeds the voltage on line 24 corresponding to the desired antenna position, causing transistor Q2 to conduct more than transistor Q1. When this occurs, the current comparator 50 output goes from a logical "0" or low level to a logical "1" or higher level. This in turn causes current comparator 52 which previously had been latched at a logical "1" or high level output to unlatch. When current comparator 52 unlatches, its output line, which was at a high, or logical "1" level, drops to a low or logical "0" level to de-energize the clockwise winding W1. With winding W1 de-energized antenna motion stops at a point slightly overshooting the 90° position corresponding to channel 2.

With the antenna directed at an azimuth angle 90° corresponding to channel 2, if it is now desired to direct the antenna to, for example, 62° corresponding to channel 8, the operator activates the digit 8 of the channel encoder 28. As a consequence of entering channel 8 into the channel encoder 28 a signal is provided on line 24 to transistor Q2 which is at a lower voltage corresponding to the desired antenna azimuth of 62° than is the signal on line 20 corresponding to the actual antenna position of approximately 90° associated with channel 2 where the antenna was positioned prior to entry of channel 8 into the channel encoder. With a lower voltage on line 24 to transistor Q2 than is on line 20 to transistor Q1, transistor Q2 is driven into conduction more than transistor Q1, causing a logical "1" or high level output from current comparator 50. The logical "1" output on line 51 from current comparator 50 is input to the negative terminal of current comparator 52, maintaining the output of the current comparator 52 at a logical "0" or low level which in turn prevents energization of the winding W1.

The 5 second duration pulse on line 40 produced as an incident to entry of channel 8 into the channel encoder 28, which 5 second duration pulse is at a relatively high, logical "1," level, is input to the positive terminal of comparator 53 causing this comparator to have at its output a relatively high or logical "1" output which via the feedback resistor latches current comparator 53 in a high level output state. The relatively high output from current comparator 53 energizes winding W2 causing the antenna 10 to rotate in the counterclockwise direction from its 90° position associated with channel 2 towards the 62° position associated with channel 8. When the antenna has slightly overhsot the 62° azimuth position corresponding to channel 8, i.e., is slightly less than 62°, the voltage on line 20 corresponding to actual antenna position which is input to transistor Q1 is less than the voltage on line 24 correlated to desired antenna position which is input to transistor Q2. As a consequence, the transistor Q1 current into the negative terminal of current comparator 50 exceeds the current from transistor Q2 input to the positive terminal of current comparator 50. The current comparator 50 output, in response thereto, goes from a relatively high or logic "1" level to a relatively low or logic "0" level. This in turn causes the current comparator 53 to unlatch and its output goes from a relatively high or logic "1" level to a relatively low or logic "0" level, de-energizing winding W2. The antenna now stops at a position representing a slight overshoot of the desired 62° azimuth position associated with channel 8, e.g., the antenna stops at 61°.

The motor winding power switching circuit, which responds to the control signals output from the current comparators 52 and 53 to selectively and alternatively energize the clockwise and counterclockwise windings W1 and W2, preferably includes opto-isolators 60 and 61 each having a light emitting diode 60a, 61a and a phototransducer 60b, 61b. When the outputs of the current comparators 52 and 53 are alternatively at relatively high or logic "1" values, their respective light emitting diodes responsive thereto emit light which activates their associated phototransducers. Activation of phototransducers 60b and 61b trigger associated silicon controlled rectifier 63 and 64, respectively. Triggering of one or the other of the SCR's 63 or 64 in turn connects a source of energizing power 65 or 66 to the windings W2 or W1 to energize the counterclockwise or clockwise winding, respectively. Thus, when high level, or logical "1," signals are present at the output of current comparators 53 and 52, windings W1 and W1 are energized, respectively.

Considering the control circuit of this invention as a whole, it is apparent that in response to a digital entry into the keyboard 28 corresponding to a desired channel, an analog voltage level corresponding in magnitude to the azimuth associated with the desired channel is compared to an analog signal correlated in magnitude to the present actual antenna position. Depending upon whether the voltage corresponding to the desired azimuth position is greater or less than the voltage corresponding to the actual azimuth position, a comparator responsive to both azimuthal inputs (actual and desired) provides an output to one or the other of two windings for driving the antenna in one or the other opposite directions to bring it to a point to where the actual antenna azimuthal position corresponds to the desired antenna azimuthal position.

The signals on line 24 correlated to the direction to which it is desired to rotate the antenna 10 could be obtained using a rotary switch. For example, the rotary switch could have a single wiper connected to a source of positive potential which, as it is rotated from channel to channel, successively makes electrical contact with stationary terminals assigned to different channels. The stationary terminals of the rotary switch would be connected to respectively different weighting resistors which would perform functions similar to the potentiometers 36-0, 36-1, . . . 36-n. Thus, the rotary switch terminals could be connected to the lefthand side of the potentiometers 36-0, 36-1, . . . 36-n instead of connecting the outputs of the inverters 35-0, 34-1, . . . 34-n to the lefthand side of the potentiometers. In lieu of a rotary switch, suitable pushbutton switching arrangements could also be used, with each pushbutton switch, when activated, connecting a voltage supply to the lefthand side of the potentiometers 36-0, 36-1, . . . 36-n.

In the preferred embodiment the signals on line 30 from the digital keyboard 38 could be derived from the channel selector which controls the tuner of a commercially available television set of the type having digital keyboard channel selection. Under such circumstances activation of a digit key to alter the tuner and select a different TV channel would also generate appropriate command signals for driving the atnenna to the desired azimuthal position corresponding to the selected channel. Thus, activation of a signal digital key would both change the tuner to receive signals of a different channel as well as rotate the antenna to the direction corresponding to the new channel selected.

TV receivers located in different geographical positions relative to fixed location transmitters can all be adapted to have their respective antennas properly directed as different channels are selected by varying the resistances of their various potentiometers 36-0, 36-1, . . . 36n. For example, if a fixed location transmitter is located in the geographical center of a city, a TV receiver located due north, if to optimally receive transmissions from the central city transmitter, must have its antenna directed due south. Similarly, a TV receiver located south of the transmitter must have its antenna directed in a northerly direction to receive optimally. The circuitry of this invention is adaptable for use with a receiver located either north or south of the fixed location central city transmitter under consideration, it being only necessary to alter the value of the resistance of the potentiometer assigned to the fixed location transmitter in question as the location of the receiver, with respect to the fixed location transmitter, is varied from point to point throughout the city.

Having described the invention, what is claimed is:

1. The apparatus comprising:

a directional antenna, means mounting said antenna for rotation about a generally vertical axis to a plurality of predetermined different azimuthal directions respectively associated with different broadcast transmitters, each said transmitter being identified by a different decimal channel identification number, a bidirectional motor drivingly connected to said antenna and having selectively alternatively energizable first winding and second winding for rotating said antenna in first and second opposite azimuthal directions, respectively, when said frst and second winidings are respectively selectively alternatively energized, an encoder including (a) a plurality of digital keys for sequentially entering the digits of transmitter identification numbers, (b) a digital encoder connected to said keys and having a plurality of different output lines each uniquely associated with a different one of said plurality of different azimuthal directions associated with different broadcast transmitters, said digital encoder responsive to said keys for providing a signal on the output line thereof corresponding to the direction associated with the broadcast transmitter identification number entered into said keyboard, said signals on said different output lines corresponding to said different directions being substantially identical, and (c) an analog encoder connected to said different output lines of said digital encoder and having a single output terminal for providing, in response to sequential identical signals on different ones of said output lines, sequential d.c. voltages of differing magnitude at said single output terminal, an antenna azimuthal direction transducer responsive to said antenna direction for sequentially providing d.c. voltages of differing magnitude on the same output line, said differing magnitude voltages corresponding to sequential different azimuthal orientations of said antenna, a comparator for comparing said voltages on said output lines of said antenna transducer and analog encoder, said comparator having a first output terminal and a second output terminal on which first and seocnd control signals are provided when the difference between said outputs of said antenna transducer and analog encoder bear first and second predetermined relationships in magnitude, and motor drive means interconnecting said first and second comparator outputs and said first and second windings, respectively, for alternatively energizing said first and second windings in response to said first and second control signals, respectively, to alternatively rotate said antenna in said first and second directions, respectively.

2. The apparatus comprising:

a directional antenna, means mounting said antenna for rotation about a generally vertical axis to a plurality of predetermined different azimuthal directions respectively associated with different broadcast transmitters, each said transmitter being identified by a different decimal channel identification number, a bidirectional motor drivingly connected to said antenna and having selectively alternatively energizable first winding and second winding for rotating said antenna in first and second opposite azimuthal directions, respectively, when said first and second windings are respectively selectively alternitively energized, a digital encoder for selectively providing an output signal on different output terminals thereof, each output terminal associated with a different channel receivng direction, in response to manual entry of different channel identifications, an analog encoder connected to the output terminals of the digital encoder and having a single output terminal for providing d.c. voltages of different magnitudes in response to the selection of different channels, an antenna azimuthal transducer responsive to said antenna direction for sequentially providing d.c. voltages of differing magnitude on the same output line, said differing magnitude voltages corresponding to sequential different azimuthal orientations of said antenna, a comparator for comparing said voltages on said output lines of said antenna transducer and analog encoder, said comparator having a first output terminal and a second output terminal on which first and second control signals are provided when the difference between said outputs of said antenna transducer and analog encoder bear first and second predetermined relationships in magnitude, and motor drive means interconnecting said first and second comparator outputs and said first and second windings, respectively, for alternatively energizing said first and second windings in response to said first and second control signals, respectively, to alternatively rotate said antenna in said first and second directions, respectively.

3. The apparatus of claim 2 wherein said digital encoder includes a rotary switch which, as it is rotated to different channels, applies said output signal to said different output terminals thereof.

4. The apparatus of claim 2 wherein said comparator incudes a first current comparator responsive to said analog encoder and said antenna transducer, and second and third current comparators each responsive to the outpuf of said first current comparator for providing said first and second control signals, respectively, in response to the output said first current comparator.

5. The apparatus of claim 1 wherein said analog encoders are each selectively adjustable such that for broadcast transmitter located at predetermined fixed locations, the analog voltage output corresponding to each channel can be varied in magnitude, and hence the orientation of the antenna altered for receiving that channel, as the location of the receiver varies from one position to another with respect to the fixed location transmitters.

6. The apparatus of claim 2 wherein said analog encoders are each selectively adjustable such that for broadcast transmitters located at predetermined fixed locations, the analog voltage output corresponding to each channel can be varied in magnitude, and hence the orientation of the antenna altered for receiving that channel, as the location of the receiver varies from one position to another with respect to the fixed location transmitters.

* * * * *

UNITED STATES PATENT AND TRADEMARK OFFICE
CERTIFICATE OF CORRECTION

PATENT NO. : 4,077,000
DATED : February 28, 1978
INVENTOR(S) : Jerry A. Grubbs

It is certified that error appears in the above-identified patent and that said Letters Patent are hereby corrected as shown below:

| | | | | |
|---|---|---|---|---|
| Col. 3 | Line 17 | "desired" | should be | --desires-- |
| Col. 5 | Line 25 | "circuit 29" | should be | --circuit 39-- |
| | Line 52 | "whcih" | should be | --which-- |
| | Line 53 | "antenna," | should be | --antenna.-- |
| Col. 6 | Line 11 | "37 0,"" | should be | --"0"-- |
| | Line 66 | "logical 1," | should be | --logical "1",-- |
| Col. 7 | Line 64 | "overhsot" | should be | --overshot-- |
| Col. 8 | Line 34 | "W1 and W1" | should be | --W1 and W2-- |
| Col. 9 | Line 49 | "frst" | should be | --first-- |
| | Line 50 | "winidings" | should be | --windings-- |
| Col. 10 | Lines 39 & 40 | "alternitively energized" | should be | --alternatively engaged-- |
| Col. 11 | Line 9 | "incudes" | should be | --includes-- |
| | Line 12 | "outpuf" | should be | --output-- |

Signed and Sealed this

Tenth Day of October 1978

[SEAL]

Attest:

RUTH C. MASON
Attesting Officer

DONALD W. BANNER
Commissioner of Patents and Trademarks